C. MONSON.
Drop Light.
No. 18,154.
2 Sheets—Sheet 1.
Patented Sept. 8, 1857.
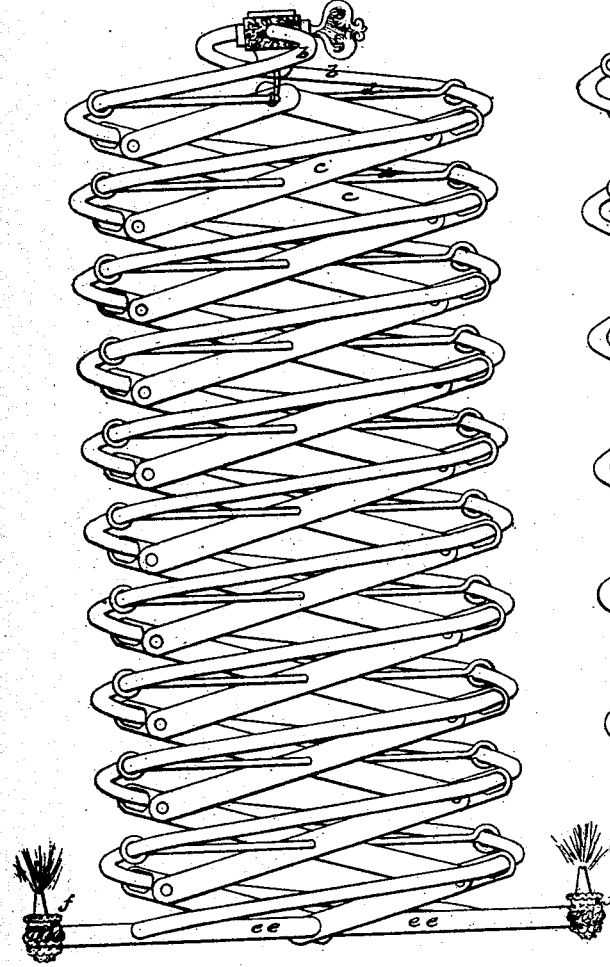
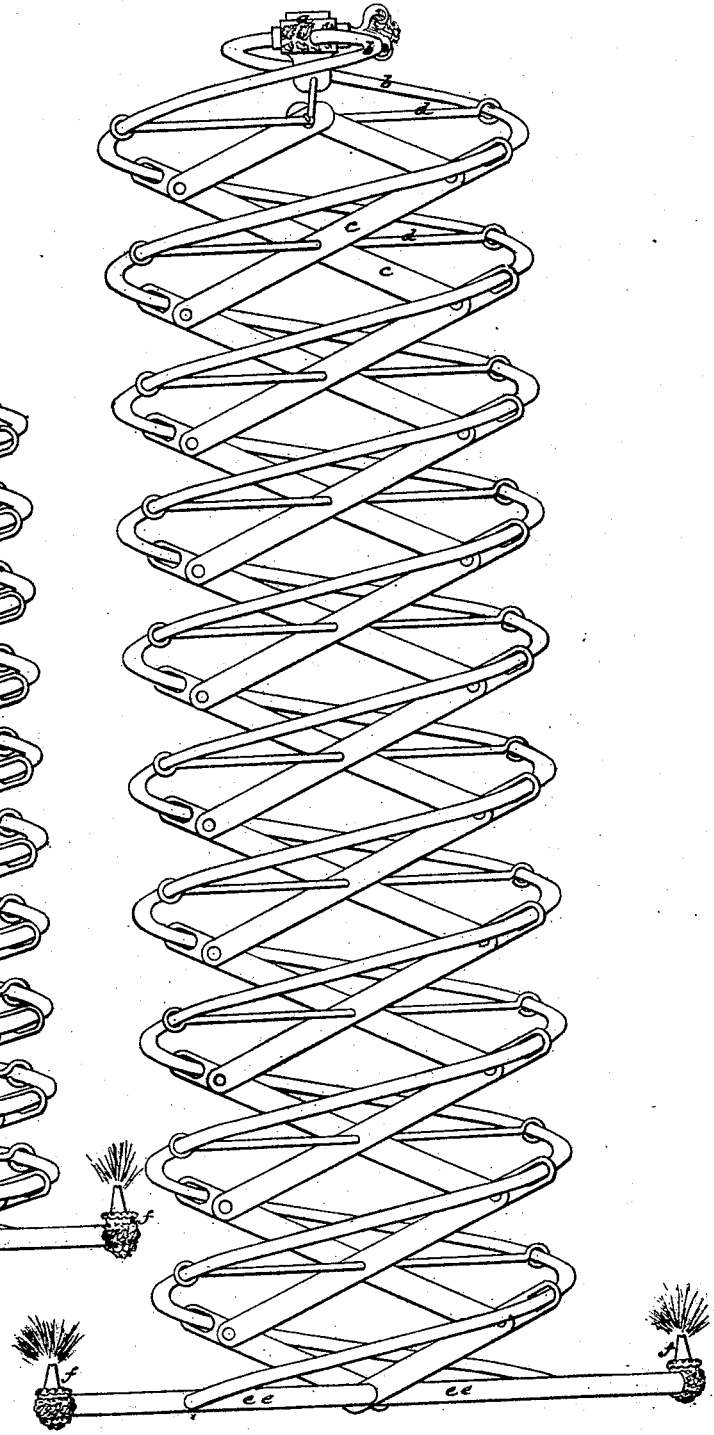

C. MONSON.
Drop Light.
No. 18,154.
2 Sheets—Sheet 2.
Patented Sept. 8, 1857.
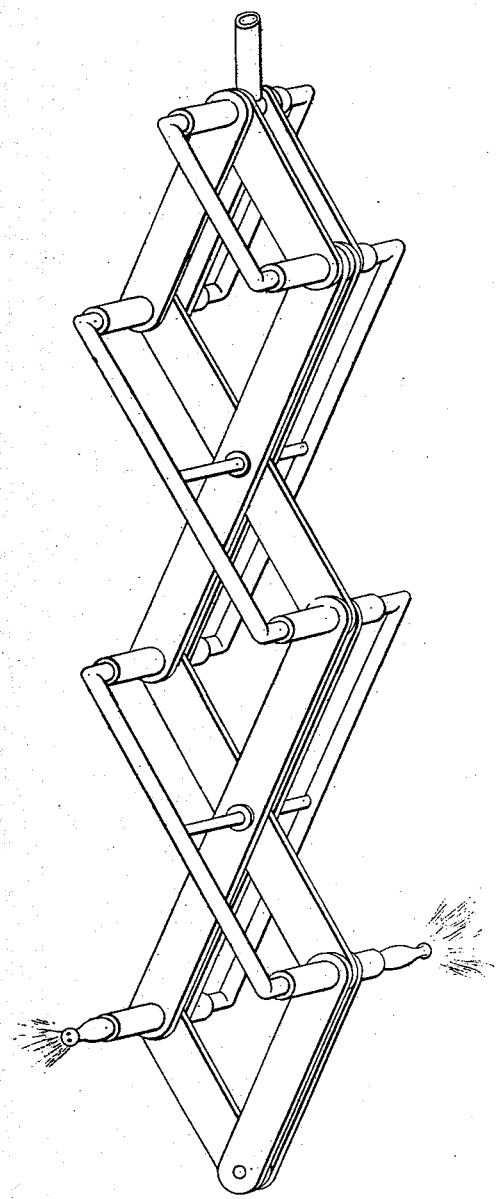
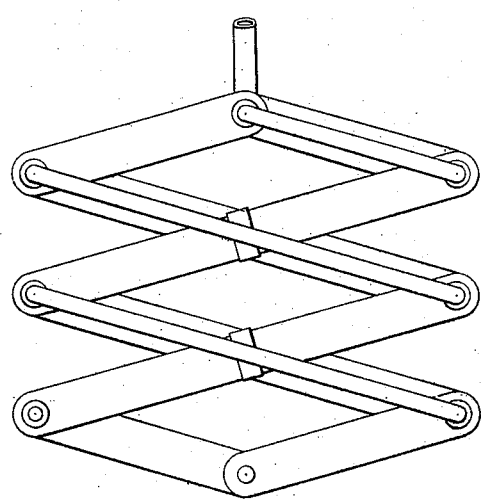
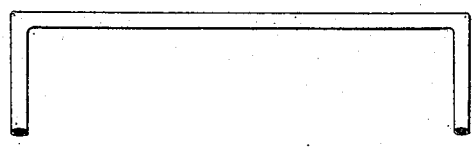
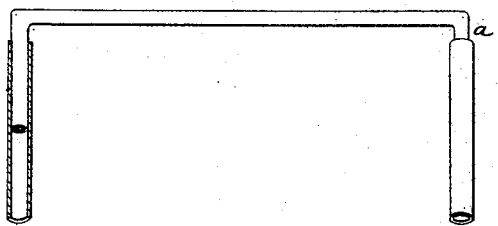

UNITED STATES PATENT OFFICE.

CHARLES MONSON, OF NEW HAVEN, CONNECTICUT.

EXTENSION GAS-TUBE.

Specification of Letters Patent No. 18,154, dated September 8, 1857.

*To all whom it may concern:*

Be it known that I, CHARLES MONSON, of the city and county of New Haven, State of Connecticut, United States of America, have invented a new and useful apparatus which I call an "Extension Gas-Tube Apparatus," and which may be used in any case wherever it becomes desirable to extend or to contract the reach of a tube, and in such a way as conveniently to dispose of the same; and I hereby declare that the following is a full, clear, and exact description of the construction and operation of the same, reference being had to the annexed drawings as a part of this description.

Of the said drawings A and B exhibit a tube of spiral-like form without joints and drawings C and D a tube of another form with joints. The form of tube may be varied.

Explanations of the drawings A and B: Drawing A represents the apparatus as nearly closed, and drawing B represents the same as partly extended. *a*, represents a nipple or bit of pipe (with stop cock) to connect apparatus with the gas. The curved line *b b* is the tube, or rather two tubes (there may be one tube or more than one) *c c* the jointed levers, the middle joint of each being made by using the levers or rods *d d*, &c., passing them through the center of the jointed levers at right angles to the same, the tubes passing through eyes or slots on ends of rods *d d*, and also passing through slots in the projections from the outer joints of the levers, the tube being thus kept steadily in place. Other guides may be attached to bear upon the tube, if others are needed, they being extended from the levers to the tube; *e e e e* a straight tube into which the curved tubes enter, the gas being discharged through the burners *f, f*.

Explanation of the drawings C, D: Drawings C, D also represent the apparatus at different degrees of extension. In these drawings, the outside joints of the lever apparatus work upon strong tubes which pass through the ends of said levers, thus forming said lever hinges, or joints. These tubes may be of three or four inches long, or more, and are to be of smooth and uniform caliber. Within these tubes the gas tubes enter by a close fit. Said hinge tubes (thus I name them to distinguish them from those which form the line of gas tubes) and the gas tubes are to be prepared by being drawn upon a steel rod, so that the fitting must be perfect and being lubricated by a suitable preparation, which forms a thin permanent coating, there can be no leaking. Drawing F shows a member of this gas tube; each end of it to be inserted into the hinge tube (as I call it) above described, and meeting its fellow gas tube from the opposite side, the two thus meeting, form a close butting joint, and may be kept thus close by a binding wire or rod, passing from central joint of the levers to the gas tube opposite. The butting ends of the gas tubes may be kept close together thus, or by a suitable collar on ends of hinge tube, or by other means. At the point which connects at the ceiling the ends of opposite tubes may, instead of meeting each other, bear against a shoulder within the hinge tube, thus leaving a central space for an orifice for the gas tube from the ceiling. Besides that close butting joint the hinge tube incloses a portion of the gas tubes closely fitting all around and having a long bearing. This bearing may be extended to any desired length by a lengthening of the inserted and the inclosing tube. Or thus, said hinge tube may be soldered to the gas tube on one side of the levers, say at *a* (see Fig. F which at *a* may represent the gas and hinge tube as thus soldered) and let the opposite gas tube (on other side of the levers) be inserted into and through said hinge tube reaching to *a*, instead of the gas tubes meeting in the middle as before described. And then a screw thread on the hinge tube near *a* may be fitted to receive another from a small movable collar attached to the gas tube at *a* which will keep the ends of the gas tubes in contact, and so dispense with the central rod which is employed for this purpose in the way before described.

There are several ways of keeping the ends of gas tubes close together within the hinge tube; I do not deem it needful to be more particular as to these ways.

Let it be noted that there is no strain at all upon the working parts of the gas tube— and the work being properly done, there can be no leakage. I may also note that the joints of the gas tube may be made to work within a tube passing through center of levers instead of at the ends.

I suppose I have thus sufficiently described this gas tube. It can be extended and contracted with the utmost facility and freedom, having a long reach compared with the space which it occupies when folded, especially if the levers are either numerous or long. I remark that there is no strain upon the gas tube, for it is all upon the levers and upon the hinges, or joints of the levers; and these can be made as strong as any chain. So that no weight, even of the heaviest chandelier can effect any strain upon the gas tube.

I may add that it seems to me to be an arrangement of tube which may be of much utility in various cases as a substitute for a flexible non-collapsing tube. It is as if a chain were to be made available both as a chain and a tube. And I think it might be useful as connected with underwater explorations; the two tubes allowing a circulation of air. Also useful wherever it is desirable, for any purpose, frequently, and in convenient form, to extend and withdraw a tube, which must resist a pressure from without.

Whether it is with tube like that of A and B or like that of C and D, it may be usable either vertically, laterally, or on an incline; but chiefly desirable as pendant from the ceiling. It may be used as an entire thing (which it is, an extension gas tube apparatus, by itself) or to connect chandeliers with the ceiling and the flow of gas. The burners may be held at any desired elevation by pulley and weight, by thumb screw, or by various other means.

I claim, not the device of extension levers by itself; nor any particular form of tube by itself; but

I claim—

1. The combination of levers and tube, or tubes, substantially as set forth.

2. I claim the use and application to a gas tube, of jointed extension levers like (or operating substantially upon the principle of) those which I have described.

3. I claim the use and application thereof as an instrument for extending the reach, and for contracting the reach of a gas tube, or of gas tubes, of whatever form, and for holding and guiding the same.

4. And, finally, I claim the use of said levers as an instrument, for relieving or preventing the strain of traction, or of weight upon said gas tube, and upon the joints thereof, substantially as shown in the drawings C and D, with the accompanying explanations of said drawings.

New Haven July 1857.

CHARLES MONSON.

Signed in presence of—
　Leond. A. Daggett,
　William M. Whitney.